C. F. HOLCOMB.
STOPPLE FOR DRAIN PIPES.
APPLICATION FILED AUG. 18, 1910.
1,042,002.
Patented Oct. 22, 1912.
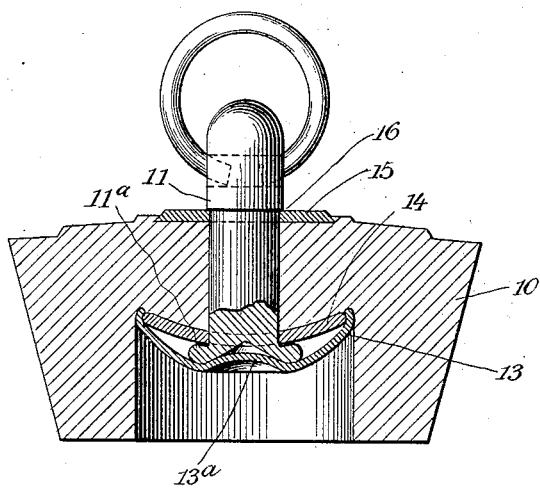
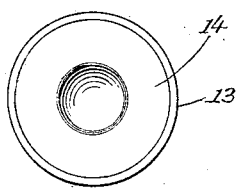
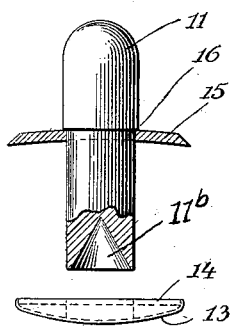
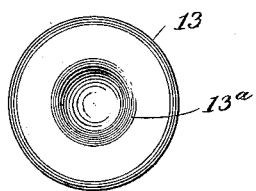
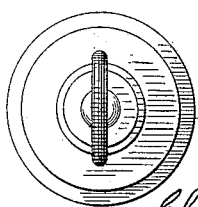
Charles F. Holcomb, Inventor.
Witnesses
Max B. A. Doring
Thomas T. Seelye
By Attorneys
W. B. Hutchinson

UNITED STATES PATENT OFFICE.

CHARLES F. HOLCOMB, OF BRIDGEPORT, CONNECTICUT.

STOPPLE FOR DRAIN-PIPES.

1,042,002.  Specification of Letters Patent.  Patented Oct. 22, 1912.

Application filed August 18, 1910. Serial No. 577,872.

*To all whom it may concern:*

Be it known that I, CHARLES F. HOLCOMB, of the city of Bridgeport, county of Fairfield, State of Connecticut, have invented a new and useful Improvement in Stopples for Drain-Pipes, of which the following is a full, clear, and exact description.

My invention relates to improvements in stopples such as are usually made of rubber or rubber compositions, and which are used to temporarily stop sink drains or for other similar purposes.

My invention relates especially to the means by which the center post of the stopple is held in place so that the body portion of the stopple will not work loose on the post.

A further object of my invention is to produce a structure which is simple and inexpensive, and by which the post can be quickly but securely fastened in place in the body of the stopple, and in which leakage between the body of the stopple and the post is prevented.

Reference is to be had to the accompanying drawings forming a part of this specification, in which similar reference characters indicate corresponding parts in all the views.

Figure 1 is a vertical sectional view of a stopple embodying my invention. Fig. 2 is a side view of the post partly broken away and a side view of the socket. Fig. 3 is a top view of the socket. Fig. 4 is a bottom view of the socket shown in Fig. 3, when in place in the stopple, and Fig. 5 is a top view of the stopple.

The stopple can be of any usual size or shape, and as shown it is the customary rubber stopple. This is provided with a center post or stud 11 which extends through a perforation in the body portion 10. The post or stud is provided with the usual ring 12 which enables the stopple to be removed easily when desired, and the post or stud is always a part of the stopple, and is counter-bored at its lower end as shown at 11$^b$. The lower end of the stud which is counter-bored is adapted to enter the hollow socket member which is comprised of a lower convex part 13 and the top disk 14, the top disk 14 having an opening to receive the lower end of the stud 11. The outer edges of the lower convex part 13 are bent up and over the periphery of the disk 14. A washer 15 is fitted on the stud so as to lie above the top surface of the plug 10, and it abuts with a shoulder 16 on the stud 11. This washer 15 is preferably made disk shape as shown in Fig. 2, so that when the stud 11 is fastened in place in the stopple it will lie flat and snug and tight against the top surface of the stopple as shown in Fig. 1.

In securing the stud 11 to the stopple 10, the stud is first put through the plug 10 with the washer 15 between the top surface of the plug and the shoulder 16, and the lower member or socket comprised of the parts 13 and 14, is placed over the protruding lower end of the stud 11. A suitable tool is then forced against the bottom of the part 13 opposite the bore 11$^b$ in the stud 11, with sufficient force to cause the part 13 to be indented as shown at 13$^a$ in Fig. 1, and to cause the lower edges of the stud to be spread out in the form of a flange as shown at 11$^a$ in Fig. 1, thus binding the part 14 firmly against the bottom of the plug 10 and securing the stud 11 firmly between the part 14 and the washer 15.

It will be observed that the greatest strain on the post and stopple is when the post is pulled up to remove the stopple from a drain, and in this case the post 11 being firmly clamped in place in the stopple by the flange on the lower edge of the post bearing against the part 14, the stud 11 cannot work loose, and danger of leakage between the stud and the body portion 10 is eliminated.

I claim:—

A drain stopple comprising a recessed yielding body having an aperture therethrough, a stem having a recess in its lower end extending through the said aperture, a cap member, comprising, a concavo-convex washer adapted to fit around the said stem and abut the bottom of said recess, and a concavo-convex disk having its edges inturned around the periphery of the said washer, a bur formed on the lower end of the stem, said bur being adapted to extend into a space, formed between the upper and lower elements of the cap member, and form a shoulder whereby pull on the stem tends to straighten the washer and force its edges against the inturned portion of the disk and thereby expand the inturned edges of the disk against the wall of the recess.

CHAS. F. HOLCOMB.

Witnesses:
L. V. ROBERTS,
A. M. GUERNSEY.

Copies of this patent may be obtained for five cents each, by addressing the "Commissioner of Patents, Washington, D. C."